(12) United States Patent
Rieke et al.

(10) Patent No.: US 7,758,992 B2
(45) Date of Patent: Jul. 20, 2010

(54) COPPER-SUBSTITUTED PEROVSKITE COMPOSITIONS FOR SOLID OXIDE FUEL CELL CATHODES AND OXYGEN REDUCTION ELECTRODES IN OTHER ELECTROCHEMICAL DEVICES

(75) Inventors: Peter C. Rieke, Pasco, WA (US); Gregory W. Coffey, Richland, WA (US); Larry R. Pederson, Kennewick, WA (US); Olga A. Marina, Richland, WA (US); John S. Hardy, Richland, WA (US); Prabhaker Singh, Richland, WA (US); Edwin C. Thomsen, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 1112 days.

(21) Appl. No.: 10/714,180

(22) Filed: Nov. 14, 2003

(65) Prior Publication Data

US 2010/0143818 A1   Jun. 10, 2010

Related U.S. Application Data

(60) Provisional application No. 60/426,611, filed on Nov. 15, 2002.

(51) Int. Cl.
*H01M 4/00* (2006.01)
(52) U.S. Cl. .................. 429/40; 429/30; 429/33; 429/46
(58) Field of Classification Search .................. 429/29, 429/30, 33, 41, 46, 220, 107
See application file for complete search history.

(56) References Cited

U.S. PATENT DOCUMENTS

| 4,045,375 | A | 8/1977 | Komatu |
| 5,064,733 | A | 11/1991 | Krist et al. |
| 5,093,301 | A | 3/1992 | Chu et al. |
| 5,145,504 | A | 9/1992 | Pyzik et al. |

(Continued)

FOREIGN PATENT DOCUMENTS

EP     0 593 281 A2    4/1994

(Continued)

OTHER PUBLICATIONS

Forthmann et al. (Ceramic coatings for cathode contacts of solid oxide fuel cells, Werkstoffwoche '98, Band III: Symposium 3, Werkstoffe fuer die Energietechnik; Symposium 7, Werkstoffe and Korrosion, Munich, Sep. 1998 (1999), Meeting Date 1998, 149-154.*

(Continued)

*Primary Examiner*—Patrick Ryan
*Assistant Examiner*—Ben Lewis
(74) *Attorney, Agent, or Firm*—Klarquist Sparkman, LLP

(57) ABSTRACT

The present invention provides novel compositions that find advantageous use in making electrodes for electrochemical cells. Also provided are electrochemical devices that include active oxygen reduction electrodes, such as solid oxide fuel cells, sensors, pumps and the like. The compositions comprises a copper-substituted ferrite perovskite material. The invention also provides novel methods for making and using the electrode compositions and solid oxide fuel cells and solid oxide fuel cell assemblies having cathodes comprising the compositions.

64 Claims, 9 Drawing Sheets

U.S. PATENT DOCUMENTS

| | | | |
|---|---|---|---|
| 5,151,334 | A | 9/1992 | Fushimi et al. |
| 5,168,095 | A | 12/1992 | Manakata et al. |
| 5,489,483 | A | 2/1996 | Soma et al. |
| 5,672,446 | A | 9/1997 | Barker et al. |
| 5,712,220 | A | 1/1998 | Carolan et al. |
| 5,744,015 | A | 4/1998 | Mazanec et al. |
| 5,783,333 | A | 7/1998 | Mayer |
| 5,817,597 | A | 10/1998 | Carolan et al. |
| 5,824,429 | A | 10/1998 | Das et al. |
| 5,843,858 | A | 12/1998 | Hardtl et al. |
| 5,904,911 | A | 5/1999 | Mori et al. |
| 5,958,304 | A | 9/1999 | Khandkar et al. |
| 5,972,296 | A | 10/1999 | Hardtl et al. |
| 5,980,840 | A | 11/1999 | Kleefisch et al. |
| 5,993,986 | A | 11/1999 | Wallin et al. |
| 6,004,688 | A | 12/1999 | Goodenough et al. |
| 6,004,696 | A | 12/1999 | Barnett et al. |
| 6,056,807 | A | 5/2000 | Carolan et al. |
| 6,146,445 | A | 11/2000 | Chen et al. |
| 6,150,290 | A | 11/2000 | Christiansen et al. |
| 6,193,904 | B1 | 2/2001 | Schoch, Jr. et al. |
| 6,228,520 | B1 | 5/2001 | Chiao |
| 6,235,187 | B1 | 5/2001 | Anderson et al. |
| 6,406,518 | B1 | 6/2002 | Bonaquist et al. |
| 6,475,657 | B1 | 11/2002 | Del Gallo et al. |
| 6,548,203 | B2 * | 4/2003 | Wallin et al. .................. 429/45 |
| 6,692,855 | B1 | 2/2004 | Aizawa et al. |
| 6,803,138 | B2 * | 10/2004 | Seabaugh et al. ............. 429/30 |
| 6,893,762 | B2 * | 5/2005 | Sarkar et al. .................. 429/31 |
| 2001/0003232 | A1 | 6/2001 | Kleefisch et al. |
| 2001/0033041 | A1 * | 10/2001 | Sogabe ........................ 264/80 |
| 2001/0044041 | A1 * | 11/2001 | Badding et al. ............... 429/32 |
| 2001/0053467 | A1 | 12/2001 | Kaneko et al. |
| 2002/0013214 | A1 | 1/2002 | Kuroda et al. |
| 2002/0015871 | A1 * | 2/2002 | Tao et al. ...................... 429/27 |
| 2002/0015877 | A1 | 2/2002 | Tao |
| 2002/0022568 | A1 | 2/2002 | Mackay et al. |
| 2003/0003237 | A1 * | 1/2003 | Seabaugh et al. ........... 427/421 |
| 2003/0134176 | A1 * | 7/2003 | Sarkar ......................... 429/40 |
| 2004/0089540 | A1 | 5/2004 | Van Heuveln et al. |
| 2004/0214070 | A1 | 10/2004 | Simner et al. |

FOREIGN PATENT DOCUMENTS

| | | |
|---|---|---|
| EP | 0 641 749 A1 | 9/1994 |
| EP | 0 503 639 B1 | 3/1995 |
| EP | 0 760 945 B1 | 12/1999 |
| WO | WO 03/041196 A1 | 5/2003 |

OTHER PUBLICATIONS

Forthmann et al. (Ceramic coatings for cathode contacts of solid oxide fuel cells, Werkstoffwoche '98, Band III: Symposium 3, Werkstoffe fuer die Energietechnik; Symposium 7, Werkstoffe and Korrosion, Munich, Sep. 1998 (1999), Meeting Date 1998, 149-154.*

Forthmann et al. (Ceramic coatings for cathode contacts of solid oxide fuel cells, Werkstoffwoche '98, Band III: Symposium 3, Werkstoffe fuer die Energietechnik; Symposium 7, Werkstoffe and Korrosion, Munich, Sep. 1998 (1999), Meeting Date 1998, 149-154.*

Kindermann et al. (j. Am. Ceram. Soc. 80 [4], 909-914 (1997).*

Forthmann et al. (Ceramic coatings for cathode contacts of solid oxide fuel cells, Werkstoffwoche '98, Band III: Symposium 3, Werkstoffe fuer die Energietechnik; Symposium 7, Werkstoffe and Korrosion, Munich, Sep. 1998 (1999), Meeting Date 1998, 149-154.*

Kindermann et al. (j. Am. Ceram. Soc. 80 [4], 909-914 (1997).*

Ralph JM, Rossignol C, and Kumar R; Electrode Materials for Solid Oxide Fuel Cells, The Electrochemical Society, Inc., $202^{nd}$ Meeting—Salt Lake City, UT, Oct. 20-25, 2002, Abstract N. 746.

Yoo J and Jacobson AJ; Oxygen Non-stoichiometry in $SrFeO_{3-x}$, The Electrochemical Society, Inc., $202^{nd}$ Meeting—Salt Lake City, UT, Oct. 20-25, 2002, Abstract No. 773.

Miyoshi S, Hong JO, Yashiro K, Kaimai A, Nigara Y, Kawamura K., Kawada T, and Mizusaki J; Effect of Nonstoichiometry on the Volume of $LaMnO_{3 \pm d}$ based Perovskite Oxides, The Electrochemical Society, Inc., $202^{nd}$ Meeting—Salt Lake City, UT, Oct. 20-25, 2002, Abstract No. 775.

Carter et al., "Improved Materials and Cell Design for Mechanically Robust Solid Oxide Fuel Cells," *2002 Fuel Cell Seminar*, pp. 874-877, Palm Springs, CA, Nov. 18-21, 2002 (Abstract).

Chick et al., "Glycine-nitrate combustion synthesis of oxide ceramic powders," *Materials Letters* 10(12):6-12, 1990.

Coffey et al., "Copper doped lanthanum strontium ferrite for reduced temperature solid oxide fuel cells," *Solid State Ionics* 175:73-78, 2004.

Figueiredo et al., "Reactions between a zirconia-based electrolyte and $LaCoO_3$-based electrode materials," *Solid State Ionics* 101(103):343-349, 1997.

Kindermann et al., "Chemical Interactions between La-Sr-Mn-Fe-O-Based Perovskites and Yttria-Stabilized Zirconia,"*J. Am. Ceram. Soc.* 80(4):909-914, 1997.

Kleinlogel et al., "Temperature Solid Oxide Fuel Cells," *Electrochemical SocietyProceedings* 99-19:225-232, 1999.

Ralph et al., "Evaluation of Potential Cathode Materials for SOFC Operation Between 500-800° C," *Electrochemical Society Proceedings* 2001-16:466-475, 2001.

Simner et al., "Sintering and Property Characterization of Strontium-Doped Lanthanum Chromite," *Electrochemical Society Proceedings* 99-19:696-705, 1999.

Simner et al., "Development of Fabrication Techniques and Electrodes for Solid Oxide Fuel Cells," *Electrochemical Society Proceedings* 2001-16:1051-1060, 2001.

Simner et al., "Optimized Lanthanum Ferrite-Based Cathodes for Anode-Supported SOFCs," *Electrochemical and Solid-State Letters* 5(7):A173-175, 2002.

Simner. et al., "Development of Cathode Materials for Low Temperature SOFCS," *2002 Fuel Cell Seminar*, pp. 344-347, Palm Springs, CA, Nov. 18-21, 2002 (Abstract).

Simner et al., "Interaction between $La(Sr)FeO_3$ SOFC cathode and YSZ electrolyte," *Solid State Ionics* 161:11-18, 2003.

Simner et al., "Enhanced low temperature sintering of (Sr,Cu)-doped lanthanum ferrite SOFC cathodes," *Solid State Ionics* 175:79-81, 2004.

Simner et al., "$La(Sr)FeO_3$ SOFC Cathodes with Marginal Copper Doping," *J. Am. Chem. Soc* . 87(8):1471-1476, 2004.

Steele et al., "Interfacial reactions associated with ceramic ion transport membranes," *Solid State Ionics* 75:157-165, 1995.

Takeda et al., "Cathodic Polarization Phenomena of Perovskite Oxide Electrodes with Stabilized Zirconia," *J Electrochem. Soc.: Electrochemical Science and Technology* 134(11):2656-2661, 1987.

Tsoga et al:, "Gadolinia-Doped Ceria and Yttria Stabilized Zirconia Interfaces: Regarding their Application for SOFC Technology,"*Acta. Mater.* 484709-4714, 2000.

* cited by examiner

COPPER-SUBSTITUTED PEROVSKITE COMPOSITIONS FOR SOLID OXIDE FUEL CELL CATHODES AND OXYGEN REDUCTION ELECTRODES IN OTHER ELECTROCHEMICAL DEVICES

CROSS REFERENCE TO RELATED APPLICATION

The present application claims the benefit of U.S. Provisional Patent Application No. 60/426,611, filed Nov. 15, 2002, which is hereby incorporated by reference.

GOVERNMENT RIGHTS

This invention was made with Government support under Contract Number DE-AC0676RLO1830 awarded by the U.S. Department of Energy. The Government has certain rights in the invention.

BACKGROUND OF THE INVENTION

The present invention relates to novel perovskite oxygen reduction electrode materials comprising partial copper substitution at the B-site of an $ABO_3$ perovskite and methods for making and using same. Electrode materials in accordance with the invention find advantageous use in oxygen reducing electrochemical devices such as, for example, solid oxide fuel cells, oxygen separators, electrochemical sensors and the like.

As a background to the invention, electrochemical devices based on solid oxide electrolytes have received, and continue to receive, significant attention. For example, solid state oxygen separation devices have received significant attention for the separation of pure oxygen from air. In addition, electrochemical fuel cell devices are believed to have significant potential for use as power sources. Fuel cell devices are known and used for the direct production of electricity from standard fuel materials including fossil fuels, hydrogen, and the like by converting chemical energy of a fuel into electrical energy. Fuel cells typically include a porous fuel electrode (also referred to as the "anode"), a porous air electrode (also referred to as the "cathode"), and a solid or liquid electrolyte therebetween. In operation, gaseous fuel materials are contacted, typically as a continuous stream, with the anode of the fuel cell system, while an oxidizing gas, for example air or oxygen, is allowed to pass in contact with the cathode of the system. Electrical energy is produced by electrochemical combination of the fuel with the oxidant. Because the fuel cells convert the chemical energy of the fuel directly into electricity without the intermediate thermal and mechanical energy step, their efficiency can be substantially higher than that of conventional methods of power generation.

Solid oxide fuel cells (SOFCs) employing a dense ceramic electrolyte are currently considered as one of the most attractive technologies for electric power generation. In a typical SOFC, a solid electrolyte separates the porous metal-based anode from a porous metal or ceramic cathode. Due to its mechanical, electrical, chemical and thermal characteristics, yttria-stabilized zirconium oxide (YSZ) is currently the electrolyte material most commonly employed. At present, the anode in a typical SOFC is made of nickel-YSZ cermet, and the cathode is typically made of lanthanum manganites, lanthanum ferrites or lanthanum cobaltites. In such a fuel cell, an example of which is shown schematically in FIG. 1, the fuel flowing to the anode reacts with oxide ions to produce electrons and water. The oxygen reacts with the electrons on the cathode surface to form oxide ions that migrate through the electrolyte to the anode. The electrons flow from the anode through an external circuit and then to the cathode. The movement of oxygen ions through the electrolyte maintains overall electrical charge balance, and the flow of electrons in the external circuit provides useful power.

Because each individual electrochemical cell made of a single anode, a single electrolyte, and a single cathode generates an open circuit voltage of about one volt and each cell is subject to electrode activation polarization losses, electrical resistance losses, and ion mobility resistant losses which reduce its output to even lower voltages at a useful current, a fuel cell assembly comprising a plurality of fuel cell units electrically connected to each other to produce the desired voltage or current is required to generate commercially useful quantities of power.

SOFCs typically operate at high temperatures, such as, for example, 650-1000° C. This allows flexibility in fuel choice and results in suitable fuel-to-electricity and thermal efficiencies; however, high temperatures impose stringent requirements on the materials selection for other components of the fuel cell or fuel cell assembly. For example, it is well recognized that such high temperatures prevent the use of metallic materials in certain components and prevent the use of other materials that would otherwise be advantageous, but that are not stable at such temperatures. In contrast, lower operating temperatures, such as, for example, temperatures of 650° C. or less, would allow the use of high temperature steels as interconnect materials and would allow the use of other desirable materials in the system, which would significantly reduce the cost of fabrication and increase the reliability of SOFC stacks.

Notwithstanding the advantages of lower operating temperatures, difficulties have been encountered in attempts to design SOFC systems that will operate efficiently at relatively lower temperatures, such as, for example, temperatures of about 650° C. or lower. For example, the materials typically used as electrodes in SOFC systems are perovskite materials that do not have suitable electrical properties at such lower temperatures. In particular, attempts to design SOFC systems that operate at lower temperatures have been unsuccessful due to the greatly reduced performance of cell components, primarily the cathode.

Current SOFC cathode development has focused on lanthanum strontium ferrite (LSF). While a substantial improvement over the older lanthanum strontium manganite in the 700° C. to 900° C. range, the performance of an SOFC would benefit from further improvements in the properties of the cathode over those exhibited by LSF.

In view of the above background, it is apparent that there is a continuing need for further developments in the field of SOFC technology. In particular, there is a need for further advancement in the development of alternative cathode materials having suitable properties for use in advanced SOFC designs including, for example, materials featuring good electrode kinetics for oxygen reduction at relatively low temperatures and robust physical and chemical durability. There is also a need for further advancement in the development of other alternative electrochemical devices that actively reduce oxygen in response to an electrical bias, such as, for example, oxygen separation devices, electrochemical sensors and the like. The present invention addresses these needs, and further provides related advantages.

SUMMARY OF THE INVENTION

Accordingly, it is one object of this invention to provide novel oxygen reduction electrodes for solid oxide fuel cells and other electrochemical devices.

It is another object of this invention to provide electrochemical devices with solid oxide electrolytes that include electrode materials provided by the present invention.

These and other objects are achieved by the present invention, which provides copper-substituted ferrite electrodes suitable for use in solid oxide fuel cells and other electrochemical devices.

The present invention also provides solid oxide fuel cells, solid oxide fuel cell assemblies and other electrochemical devices that include copper-substituted ferrite materials provided by the present invention.

Further forms, embodiments, objects, features, and aspects of the present invention shall become apparent from the description contained herein.

BRIEF DESCRIPTION OF THE FIGURES

Although the characteristic features of this invention will be particularly pointed out in the claims, the invention itself, and the manner in which it may be made and used, may be better understood by referring to the following description taken in connection with the accompanying figures forming a part hereof.

DESCRIPTION OF THE PREFERRED EMBODIMENTS

Figure 1:
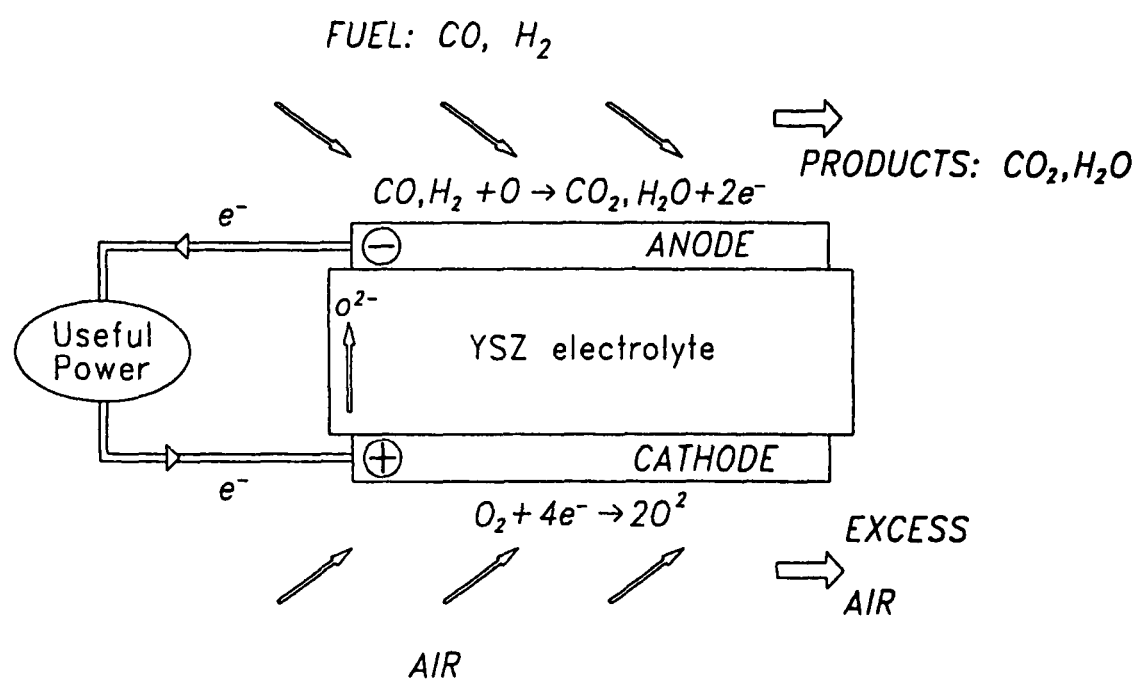
FIG. 1 depicts a general schematic diagram showing the function of a solid oxide fuel cell.

For the purpose of promoting an understanding of the principles of the invention, reference will now be made to preferred embodiments and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present invention provides novel oxygen reduction electrode materials for solid oxide electrochemical devices such as, for example, electrodes for electrolyzers, electrodes for electrochemical sensors and air electrodes, i.e., cathodes, for solid oxide fuel cells. The invention also provides novel methods for making electrodes for electrochemical devices and electrochemical devices and assemblies having electrodes comprising inventive compositions. The invention is described herein primarily by reference to solid oxide fuel cell (SOFC) technology, and a variety of examples are provided herein showing advantageous features and characteristics of the invention in relation to SOFC technology; however, it is not intended that the invention be limited to use in connection with SOFC devices.

The present invention is in one respect directed to oxygen reduction electrodes that are suitable for use in an SOFC system operating over a wide temperature range of as low as 550° C. to 1000° C. Because losses associated with the cathode generally become more limiting as the temperature decreases, advantages of the present invention are most apparent at the lowest operating temperatures. In this regard, copper-substituted ferrite materials described herein feature suitable electrical performance characteristics (i.e., oxygen reduction kinetics) at relatively low temperatures, and also feature robust physical and chemical durability. The present invention therefore enables the construction of a SOFC system that operates at a relatively low temperature, which has multiple advantages, including, for example, reducing the detrimental consequences of mismatched thermal expansion properties of materials in the SOFC, and enabling the use of steel interconnects in a standard SOFC stack design, which would otherwise not be compatible with a standard SOFC system that operates at relatively high temperatures. Each of these advantages results in the further advantage of substantially reducing manufacturing costs and improving reliability of SOFC systems.

It is well known to a person of ordinary skill in the relevant field that a SOFC can have a wide variety of configurations, including, for example and without limitation, a planar (also referred to as "flat plate") configuration, a tubular configuration and a corrugated configuration. It is to be understood that SOFC cathode materials provided by the present invention can be advantageously used in a wide variety of SOFC configurations, and such are within the scope of the invention.

The present invention provides a copper-substituted ferrite composition for use as a cathode material for a SOFC. The copper-substituted ferrite cathode (or "air electrode") composition comprises a perovskite crystal structure that includes some amount of copper substitution for iron at the B-site. The term "substitution" as used herein refers to the presence of a substitute element in the chemical structure of the lanthanum ferrite perovskite. Such substitution is also described in the relevant field using the term "doping." For ease of description, these terms are used interchangeably herein. For example, as used herein, the term "copper-substituted" is used interchangeably with the term "copper-doped", and these terms are intended to mean that the ferrite perovskite composition has copper included in its crystal structure. Similarly, in certain embodiments, the perovskite composition includes one or more substitute elements at the A-site of an $ABO_3$ structure, which is interchangeably referred to as "A-site substitution" or "A-site doping."

While it is not intended that the invention be limited by any theory whereby it achieves its advantageous result, it is believed that the copper is incorporated into the composition by B-site substitution, wherein copper atoms replace iron atoms in the "B-site" of the perovskite crystal structure. It is also possible that some portion of the copper is incorporated into the material as an oxide in a separate phase, thereby forming a composite including a copper oxide phase and a perovskite structure phase though that has not been observed. Based upon the results of performed laboratory work, it is believed that B-site substitution best describes the manner in which copper is incorporated into lanthanum ferrite; however, it is intended that the invention also encompass materials in which a portion of the copper is present in a separate oxide phase. For purposes of describing the present invention, the term "copper-substituted ferrite" and related terms are intended to encompass ferrite compositions modified by the addition of copper irrespective of the location of the copper in the composition.

As will be readily appreciated by a person of ordinary skill in the relevant art, perovskite compositions are typically referred to by the general formula: $ABO_3$, wherein "A" represents the base element at the A-site of the crystal structure and "B" represents the base element at the B-site of the structure. In ferrite compositions as described herein, the base element at the B-site is iron, and thus the general formula for ferrite perovskite compositions is represented by the general formula: $AFeO_3$. "A" in the above formula is a lanthanide or yttrium or combinations thereof. In one preferred embodiment, "A" is lanthanum, and for purposes of describing the present invention, reference will be made to multiple lanthanum ferrite compositions, i.e., ferrites in which the base element at the A-site of the structure is lanthanum. Lanthanum ferrites are represented by the general formula: $LaFeO_3$. Although reference is made primarily to lanthanum ferrite materials, it is to be understood that the present invention also contemplates other base elements at the A-site of the crystal structure.

For purposes of describing the invention, the amount of copper included in an inventive composition is described in terms of atomic percent (at. %), which is designated herein by the variable "y". The term "atomic percent" as used herein refers to the atomic ratio of copper in the composition to total B-site atoms present in the composition. A-site dopants are also described in terms of atomic percent, which is identified herein by the variable "x". As described in the Examples, inventive compositions can be made by glycine/nitrate combustion method, or can alternatively be made using other methods as would occur to a person of ordinary skill in the art, such as, for example, by a Pechini method, by a solid state reaction or by a citrate process. The present invention also contemplates ferrite compositions substituted with a mixture of copper and one or more other transition metals, such as, for example, nickel, cobalt, manganese, aluminum or chromium.

The perovskite crystal structure of an A-site and B-site-substituted lanthanum ferrite perovskite is represented by the general formula:

$$La_{1-x}A_xB_yFe_{1-y}O_3$$

(referred to herein as "Formula 1"), where each of x and y is a value between zero and one. In Formula 1, A can include, for example, an A-site dopant selected from the group consisting of Mg, Ca, Sr, Ba, Pr, Nd, Sm and combinations thereof. In formula 1, B comprises copper, a combination of copper with any one or more of nickel, cobalt, manganese, aluminum, or chromium or a combination of copper with one or more other dopants. A person of ordinary skill in the art will appreciate that, in a composition in which the B-site dopant is copper alone, the perovskite structure of the composition can be represented by the formula:

$$La_{1-x}A_xCu_yFe_{1-y}O_3$$

(referred to herein as "Formula 2"). A person of ordinary skill in the art will also understand that the relative amounts of A and B in a substituted lanthanum ferrite perovskite structure is limited by the "solubility" of A and B in the crystal structure. In certain embodiments, "x" in Formula 1 and Formula 2 is a nonzero value up to about 0.8 and "y" is a value up to about 0.6. One or both of A and B in a substituted lanthanum ferrite perovskite composition can be a mixture of a plurality of suitable materials. For example, where the perovskite composition includes a mixture of two A-site dopants and a mixture of two B-site dopants, the composition comprises a perovskite crystal structure that can be represented by the general formula:

$$La_{1-x'-x''}A'_{x'}A''_{x''}B'_{z'}B''_{z''}Fe_{1-z'-z''}O_3$$

(referred to herein as "Formula 3"), where A' and A" are different A-site dopants in the composition and B' and B" are different B-site dopants in the composition. In this formula, the sum of x' and x" is a value between zero and 1 and the sum of z' and z" is a value between zero and one. It is of course not intended that the invention be limited to compositions having one or two A-site and/or B-site dopants. Rather, Formula 3 is provided as a non-limiting example of a composition including multiple A-site and B-site dopants.

In one embodiment of the invention, wherein a copper-substituted ferrite material is formed using a mixture of copper and one or more transition metals, at least about 5% of the B-site dopant is copper. In another embodiment, at least about 25% of the B-site dopant is copper. In yet another embodiment, at least about 50% of the B-site dopant is copper. In still another embodiment, at least about 75% of the B-site dopant is copper. Copper-substituted ferrite compositions of a wide variety of formulas in accordance with the invention can be made by providing a mixture, preferably a homogenous mixture, of copper and one or more transition metals or other dopants for making a ferrite composition as described herein.

In one preferred embodiment of the invention, a copper-substituted lanthanum ferrite composition is provided in which the copper content is at least about 2 atomic percent (at. %). In another embodiment, the copper content is from about 2 to about 60 at. %. In still another embodiment, the copper content is at least about 5 at. %. One preferred composition in accordance with the invention is a copper-substituted lanthanum strontium ferrite. In one embodiment, strontium dopant is present in the perovskite crystal structure in an amount up to about 80 at. % (wherein "at. %" for strontium, or other A-site dopant, is defined as the atomic ratio of strontium in the composition to the total number of A-site atoms present in the composition) and copper is present in an amount up to about 50 at. %. In another embodiment of the invention, strontium is present in an amount up to about 50 at. % and copper is present in an amount up to about 40 at. %. In another embodiment, strontium is present in an amount from about 5 at. % to about 50 at. % and copper is present in an amount from about 5 at. % to about 40 at. %. In other embodiments, scandium and yttrium are used as the A-site dopant for a lanthanum ferrite material, either alone or together with strontium.

In a further embodiment of the invention, a copper-substituted ferrite composition is provided that has thermal expansion characteristics that correspond to thermal expansion characteristics of a preselected solid oxide electrolyte material, such as, for example, a zirconia, a ceria, a lanthanum gallate or a bismuth oxide. In one embodiment, a copper-substituted ferrite composition is provided that has a coefficient of thermal expansion of from about $8 \times 10^{-6}$ to about $15 \times 10^{-6}$ $K^{-1}$. In another embodiment, a copper-substituted ferrite composition is provided that has a coefficient of thermal expansion of from about $9 \times 10^{-6}$ to about $14 \times 10^{-6}$ $K^{-1}$. In yet another embodiment, a copper-substituted ferrite composition is provided that has a coefficient of thermal expansion of from about $9.5 \times 10^{-6}$ to about $13 \times 10^{-6}$ $K^{-1}$.

In another embodiment of the invention, a copper-substituted lanthanum ferrite composition is provided that has a polarization resistance at 650° C. of no greater than about 0.3 $\Omega cm^2$. In another embodiment, a composition is provided that has a polarization resistance at 650° C. of no greater than about 0.06 $\Omega cm^2$. In a preferred embodiment, the composition exhibits a polarization resistance at 750° C. of no greater than about 0.05 $\Omega cm^2$ in wet hydrogen versus Pt/air.

A copper-substituted ferrite material can be made in accordance with the invention by glycine/nitrate combustion method from a combination of ingredients, as is well within the purview of a person of ordinary skill in the art. For example, when making a copper-substituted lanthanum strontium ferrite material, nitrates of Cu, La, Sr and a Fe-containing compound can be mixed in predetermined proportions with, for example, glycine and combusted to produce a powder comprising the copper-substituted lanthanum strontium ferrite. The glycine-metal nitrate synthesis process is described in detail in U.S. Pat. No. 5,114,702 issued May 19, 1992 to L. R. Pederson, L. A. Chick, and G. J. Exarhos, entitled "Metal Oxide Ceramic Powders and Method of Making Same", which is incorporated herein by reference in its entirety. As an alternative to the glycine/nitrate combustion method, it is also contemplated that inventive compositions can be made using a "solid state reaction method" from starting materials in oxide or salt form at high temperature or using the citrate process. As another example, inventive compositions can be made using the Pechini method, as described in U.S. Pat. No. 3,330,697. In this method, oxides and nitrates are complexed in an aqueous solution with citric acid and heated with ethylene glycol. It is, of course, understood that these methods are provided solely as examples of ways to make inventive compositions, and it is not intended that the invention be limited thereby.

A copper-substituted ferrite material made or selected in accordance with the invention can be formed into a solid oxide fuel cell cathode or an electrode for other types of oxygen reducing electrochemical devices. A copper-substituted ferrite solid oxide fuel cell cathode can be made in accordance with one aspect of the invention by providing an electrolyte substrate and applying to the electrolyte substrate: (1) an anode layer comprising a suitable composition, and (2) a cathode layer selected in accordance with the invention positioned on the side of the electrolyte layer opposite the anode layer. The cathode layer can be applied to the electrolyte layer either before or after the anode layer is applied. A fuel cell made in such a manner is referred to as an "electrolyte-supported" cell. It is also recognized that the cathode layer can provide the support substrate in some manufacturing protocols for making fuel cells according to some designs. In such a protocol, a cathode substrate layer is provided, an electrolyte layer is applied to a cathode substrate, and then an anode layer is applied to the electrolyte/cathode component adjacent the electrolyte layer. Such an embodiment is referred to herein as a "cathode-supported cell."

In alternative embodiments of the invention, a solid oxide fuel cell can be made by first providing an anode substrate and then applying an electrolyte layer to the anode substrate. A fuel cell made in such a manner is referred to as an "anode-supported" cell. In this manner of making an electrochemical cell, an anode substrate is independently formed, for example, by tape casting, tape calendering or other method that would occur to a person of ordinary skill in the art, and an electrolyte layer is applied to the anode substrate, such as, for example, by painting, spraying, dip coating, spattering or sedimentation, followed by application of a cathode layer over the electrolyte. In other embodiments, particularly in methods for making fuel cells having a tubular construction, a porous inert substrate can be provided upon which each of the cathode, electrolyte and anode layers is sequentially applied.

Figure 2:
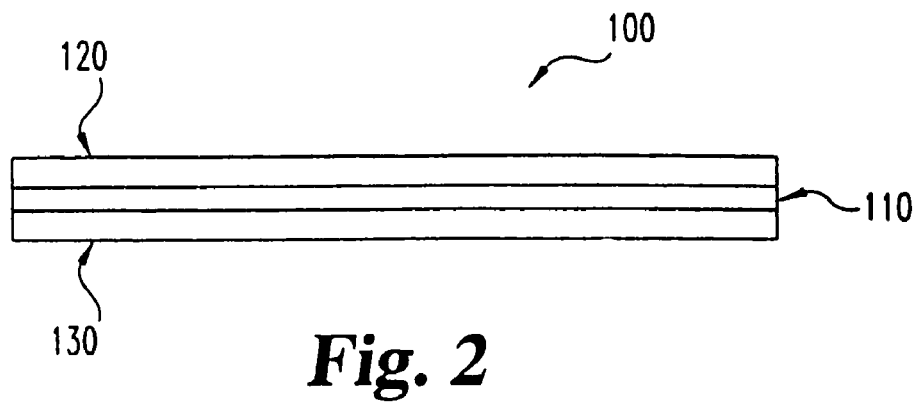
FIG. 2 is a schematic diagram of an embodiment of a fuel cell in accordance with the invention.

When constructing an electrolyte-supported cell using electrode materials made by the glycine/nitrate combustion method, the SOFC cathode is made by calcining the copper-substituted lanthanum ferrite material to provide a calcined material and mixing the calcined product with a binder to provide a cathode ink. In one embodiment, the calcined material is ground before it is mixed with the binder. For example, the calcined material can be ground to an average particle size of up to about 2 microns. Alternatively, an average particle size of up to about 0.5 microns is used. The grinding can be accomplished by attrition milling. In one embodiment, the grinding is achieved by powder milling the calcined mixture with media at about 500 to about 600 rpm in a 3-roll mill to an average particle size of no greater than about 0.5 microns to provide an intermediate product; drying the intermediate product; and passing the intermediate product through a screen to provide the ground product. The screen can have a mesh size of, for example, from about 200 to about 400 mesh. In a preferred method, the screen has a mesh size of about 325 mesh. The cathode ink is then applied to a solid oxide electrolyte component and sintered to provide a SOFC cathode. As stated above, an anode layer can be applied to the opposite side of the solid oxide electrolyte either before of after application and sintering of the cathode ink. The fuel cell thus has a three-layer configuration as shown schematically in FIG. 2, in which fuel cell 100 includes electrolyte layer 110, anode layer 120 and cathode layer 130.

A wide variety of binders can be selected for use in accordance with the invention to make a cathode ink, many of which are available commercially. In one embodiment of the invention, the binder is a screen-printing binder, such as, for example, BX-18, which is commercially available from Ferro Corporation. When a screen-printing binder is used, the cathode ink can be conveniently applied to a solid oxide electrolyte component by a screen printing process. Screen printing processes, and equipment that can be used therefore, are well known in the art. It is, of course, not intended that the invention be limited to screen-printing applications. In other embodiments, the cathode ink can be applied to a solid oxide electrolyte component by painting, spraying, dip coating, spattering or sedimentation. In addition, the cathode ink can be provided in a variety of alternative forms, including, for example, as slurries, liquid suspensions, pastes and others.

In one embodiment, a layer of copper-substituted ferrite material in a fuel cell in accordance with the invention has a thickness of at least 3 microns. In another embodiment, the layer of copper-substituted ferrite material has a thickness of at least about 5 microns. In yet another embodiment, the layer of copper-substituted ferrite material has a thickness of at least about 10 microns. When forming an electrolyte-supported, cathode-supported or inert material-supported cell, the layer of copper-substituted ferrite material can advantageously have a thickness of from about 10 to about 50 microns.

In one aspect of the invention, therefore, there is provided an integral solid oxide fuel cell for electrochemically reacting a fuel gas with an oxidant gas to produce a DC output voltage. The solid oxide fuel cell includes a layer of ceramic ion conducting electrolyte defining first and second opposing surfaces; a conductive anode layer in contact with the first surface of the electrolyte layer; and a conductive cathode layer in contact with the second surface of the electrolyte layer. The cathode layer comprises a copper-substituted ferrite cathode material selected in accordance with the present invention. In one embodiment, the copper-substituted ferrite cathode material forms essentially the entire cathode layer.

In other embodiments, the cathode can include a combination of an inventive copper-substituted ferrite cathode material and another material, such as, for example, an additional conducting material or the like. In one embodiment, the respective materials are formed into discreet sublayers to form the layer. For example, they can be formed by placing a sublayer of copper-substituted ferrite material adjacent a solid oxide electrolyte and then forming a second sublayer of a second material over the copper-substituted ferrite cathode material. Alternatively, the cathode can be formed by applying the second material adjacent the solid oxide electrolyte and then applying the copper-substituted ferrite cathode material thereover. In another embodiment, the cathode layer comprises a substantially homogenous mixture of a copper-substituted ferrite material made or selected in accordance with the invention and a finely-divided form of another material, such as, for example, a conductive material.

In one embodiment, the copper-substituted ferrite material comprises at least about 75% of the cathode, measured by thickness, by volume percent or by mass percent. In another embodiment, the copper-substituted ferrite material comprises at least about 50% of the cathode. In yet another embodiment, the copper-substituted ferrite material comprises at least about 25% of the cathode. In certain embodiments, the copper-substituted ferrite material is in direct contact with the electrolyte. In other embodiments, the copper-substituted ferrite material is separated from the electrolyte by an interlayer. For example, in certain preferred embodiments, a samarium-doped cerium oxide (SDC) layer is positioned between the copper-substituted ferrite and the electrolyte. Indeed, in some embodiments, this SDC interlayer is important to prevent the electrolyte material, such as, for example, a yttria stabilized zirconia (YSZ) from reacting with the copper-substituted ferrite in a manner that adversely affects the functionality of the cell. In other embodiments, such an interlayer is not necessary or desired, and can be absent or, alternatively, substituted by other layers, such as, for example, layers that improve adhesion, match thermal expansivity or prevent chemical reaction.

Figure 2A:
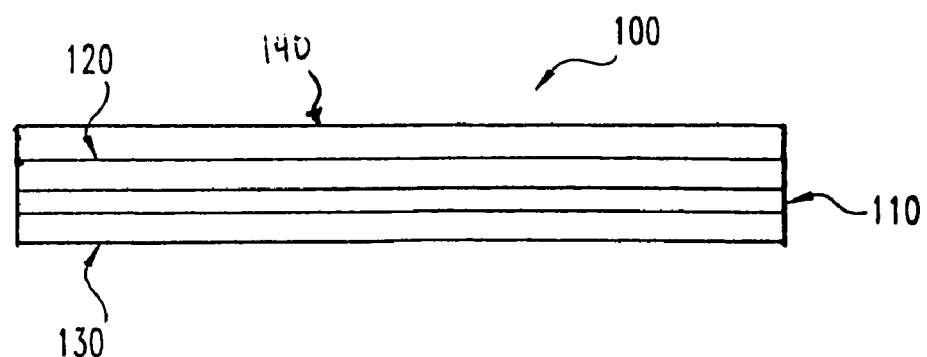
FIG. 2A is a schematic diagram of an embodiment of a fuel cell unit including an interconnect in accordance with the invention.

The fuel cell having a cathode comprising a copper-substituted ferrite material selected in accordance with the invention can have a wide variety of configurations, including, for example and without limitation, a planar fuel cell, a tubular fuel cell or a corrugated fuel cell. As a person of ordinary skill in the art will appreciate, with respect to planar SOFC designs, multiple electrochemical cells are typically positioned adjacent one another in series to form a stack. For example, planar solid oxide fuel cell stacks typically comprise a plurality of stacked cathode-electrode-anode-interconnect repeat units with an electrical interconnect between the cathode and the anode of adjacent cells. A representative example of a cathode-electrode-anode-interconnect unit is set forth schematically in FIG. 2A, wherein interconnect 140 is positioned adjacent anode 120. The fuel cell assembly can also include ducts or manifolding to conduct the fuel and oxidant into and out of the stack. Channels for gas flow, either in a cross-flow or a co-flow or a counterflow configuration, are usually incorporated into the cathode, anode and/or interconnect. Further information pertaining to various configurations that can advantageously be used in connection with the present invention is provided in copending U.S. Patent Application filed Apr. 26, 2002 entitled MULTI-LAYER SEAL FOR ELECTROCHEMICAL DEVICES, which is hereby incorporated herein by reference in its entirety.

With respect to tubular SOFC designs, conventional tubular SOFCs typically include an interior ceramic air electrode in the form of a porous tube. Some tubular SOFC designs also include a porous support tube on the interior of the cathode, which provides structural support for the tubular fuel cell, and also provides a substrate upon which other layers of the cell can be deposited during cell fabrication. The outer surface of the air electrode is mostly covered by a solid electrolyte material, typically made of YSZ. The outer surface of the solid electrolyte is covered by a cermet fuel electrode. In use of a tubular SOFC device, air or oxygen is caused to flow through the center of the tube and a gaseous fuel is caused to contact the anode on the outside of the tube.

It is, of course, understood that there are many design possibilities for fuel cells within these and other categories. Examples of different configurations are provided, for example, in U.S. Pat. No. 5,993,986 to Wallin et al., U.S. Pat. No. 6,106,967 to Virkar et al., U.S. Pat. No. 5,238,754 to Yasuo et al., U.S. Pat. No. 4,997,726 to Akiyama et al., U.S. Pat. No. 4,761,349 to McPheeters et al., U.S. Pat. No. 5,827,620 to Kendall, U.S. Pat. No. 6,248,468 to Ruka et al., U.S. Pat. No. 5,258,240 to Di Croce et al., U.S. Pat. No. 5,932,146 to Kuo et al. and U.S. Pat. No. 4,849,254 to Spengler et al., each of which is hereby incorporated by reference herein. It is, of course, not intended that the invention be limited to these exemplary configurations. The present invention contemplates the use of inventive cathode materials in all such fuel cell configurations now known or later developed, without limitation to particulars of the design. In a preferred embodiment, the fuel cell is a planar fuel cell.

Figure 3:
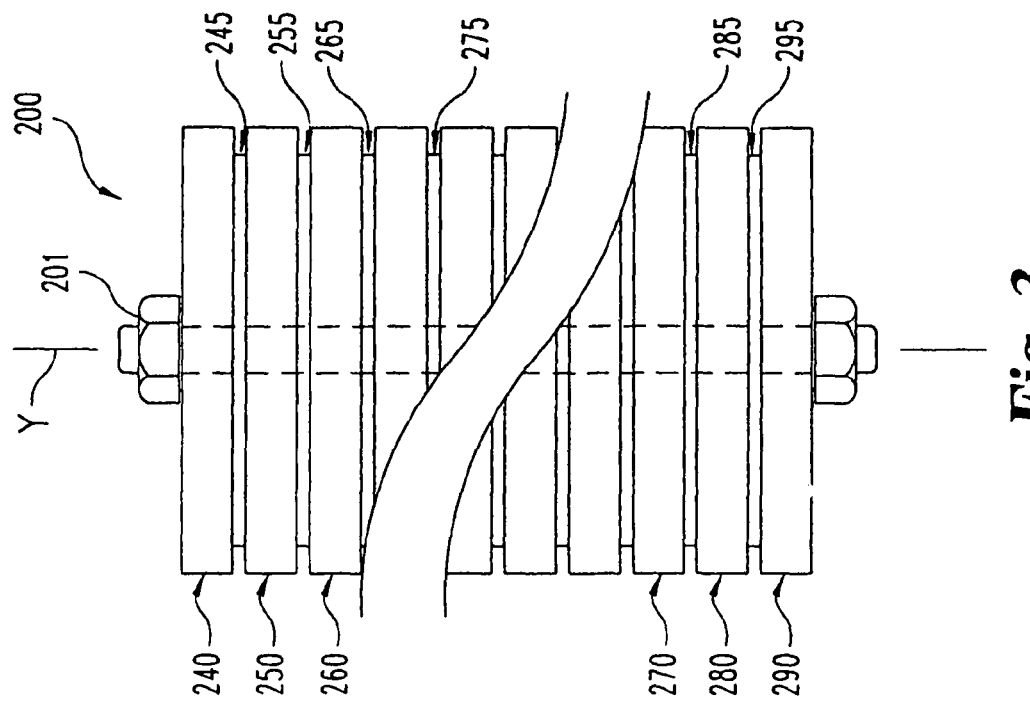
FIG. 3 is a schematic diagram of an embodiment of an electrochemical device of the invention.

In one aspect of the invention, depicted schematically in FIG. 3, an inventive fuel cell is incorporated in a fuel cell assembly 200 that includes a plurality of solid oxide fuel cells 240, 250, 260, 270, 280, 290. The individual cells are separated by seals 245, 255, 265, 275, 285, 295 and potentially one or more additional structures (not shown), such as, for example, conductive interconnects, gas flow components and the like. One embodiment of the invention is a solid oxide fuel cell assembly for electrochemically reacting a fuel gas with a flowing oxidant gas at an elevated temperature to produce a DC output voltage, the assembly including a plurality of integral fuel cell units 240, 250, 260, 270, 280, 290, wherein each unit comprises a layer of ceramic ion conducting electrolyte disposed between and in contact with a conductive anode layer and a conductive cathode layer as described above, and wherein at least one unit includes a conductive cathode layer comprising an inventive cathode material as described herein. The assembly also preferably includes a system for passing a gaseous fuel in contact with said anode layers and passing an oxidizing gas in contact with said cathode layers (not shown); and a system for utilizing electrical energy produced by said fuel cells (not shown).

In view of the advantageous features of copper-substituted ferrites described herein, the present invention enables the construction of a SOFC system that can advantageously be operated at a temperature of about 750° C. or less. Furthermore, the present invention enables the construction and use of an excellent SOFC that includes metallic components, such as, for example metallic interconnects, and thus feature multiple advantages over prior SOFC systems. A SOFC system can also be constructed utilizing the present invention that includes components made of other materials having advantageous properties that were not heretofore available due to the high temperatures at which prior SOFC systems were operated.

As will be appreciated by a person of ordinary skill in the art in view of the present description, in one form of the present invention, a solid oxide fuel cell is provided for electrochemically reacting a fuel gas with an oxidant gas to produce a DC output voltage is provided. The solid oxide fuel cell includes a layer of ceramic ion conducting electrolyte defining first and second opposing surfaces, a conductive anode layer positioned at the first surface of said electrolyte layer, and a conductive cathode layer positioned at the second surface of said electrolyte layer. Thus, the layers are oriented in a manner whereby the electrolyte layer is disposed between said anode layer and said cathode layer. In certain preferred embodiments of the invention, the fuel cell also includes at least one metallic interconnect.

The conductive cathode layer comprises a copper-substituted ferrite perovskite material. In one embodiment, copper is present in the perovskite material in an amount of at least about 2 atomic percent. In another embodiment, copper is present in the copper-substituted ferrite material in an amount of at least about 5 atomic percent. One preferred perovskite material provided by the invention is a copper-substituted lanthanum ferrite perovskite material. The material in alternate forms includes an A-site dopant selected from the group consisting of Mg, Ca, Sr, Ba, Pr, Nd, Sm and combinations thereof. In one preferred embodiment, the A-site dopant is strontium. In another embodiment, the A-site dopant is present in the copper-substituted lanthanum ferrite material in an amount of from about 5 atomic percent to about 80 atomic percent and copper is present in the copper-substituted lanthanum ferrite material in an amount of from about 5 atomic percent to about 60 atomic percent. Another preferred perovskite material provided by the invention is a copper-substituted lanthanum ferrite material having, in addition to copper, at least one B-site dopant selected from the group consisting of nickel, cobalt, manganese, aluminum and chromium.

In one embodiment, the copper-substituted ferrite cathode exhibits a polarization resistance of from about 0.03 to about 0.50 Ωcm² at 650° C. in air. In another embodiment, the copper-substituted ferrite cathode exhibits a polarization resistance of about 0.06 Ωcm² at 650° C. in air.

In one fuel cell provided by the invention, the copper-substituted ferrite material is in contact with the electrolyte layer. In another embodiment, the fuel cell includes an interlayer between the electrolyte layer and the cathode layer. In one preferred fuel cell, the copper-substituted ferrite material is formed as a layer having a thickness of from about 1 to about 50 microns. In another embodiment, the copper-substituted ferrite material is formed as a layer having a thickness of from about 1 to about 30 microns. The copper-substituted ferrite material can make up essentially the entire cathode layer or, alternatively, the copper-substituted ferrite material can comprise about 25% or more of said cathode layer. For example, the cathode can be formed such that it is formed of a substantially homogenous mixture of a copper-substituted ferrite material and a finely-divided form of a second material.

The cathode layer in one embodiment of the invention is a perovskite composition having the formula:

$$La_{1-x-x'}Sr_xA'_{x'}Cu_yB'_{y'}Fe_{1-y-y'}O_3$$

wherein x is from about 0.05 to about 0.6; y is from about 0.05 to about 0.5; x' is from 0 to about 0.5; and y' is from 0 to about 0.4.

In another form of the invention, there is provided a solid oxide fuel cell assembly for electrochemically reacting a fuel gas with a flowing oxidant gas to produce a DC output voltage. The assembly includes a plurality of integral fuel cell units, each unit comprising a layer of ceramic ion conducting electrolyte disposed between a conductive anode layer and a conductive cathode layer as described above. In certain preferred embodiments of the invention, the fuel cell assembly also includes at least one metallic interconnect. In other embodiments, the assembly includes a system for passing a gaseous fuel in contact with said anode layers and passing an oxidizing gas in contact with said cathode layers, and a system for utilizing electrical energy produced by said fuel cells.

Another form of the invention is a method for producing electrical energy, comprising: (1) providing a solid oxide fuel cell, the solid oxide fuel cell including a layer of ceramic ion conducting electrolyte defining first and second opposing surfaces; a conductive anode layer positioned at the first surface of the electrolyte layer; and a conductive cathode layer selected in accordance with the invention positioned at the second surface of the electrolyte layer; wherein the electrolyte layer is disposed between the anode layer and the cathode layer; (2) causing air or other oxidizing gas to flow in contact with the cathode layer; and (3) causing a fuel gas to flow in contact with the anode layer to provide electrical energy. In one mode of practicing the invention, the fuel cell is operated at a temperature of no greater than about 750° C. In another mode of practicing the invention, the solid oxide fuel cell also includes at least one metallic interconnect.

In yet another form, the invention provides a method for making an oxygen reduction electrode for an electrochemical device. This method includes: (1) providing a copper-substituted ferrite perovskite material; and (2) forming the copper-substituted ferrite perovskite material into an electrode for an electrochemical device.

It will be appreciated that the present invention also provides an oxygen reduction electrode for an electrochemical device, such as, for example, a solid oxide fuel cell, an electrolyzer, an electrochemical pump or an electrochemical sensor, the electrode including a copper-substituted ferrite perovskite material.

Reference will now be made to specific examples illustrating various preferred embodiments of the invention as described above. It is to be understood, however, that the examples are provided to illustrate preferred embodiments and that no limitation to the scope of the invention is intended thereby.

Example One

General Experimental Set-Up

Figure 8:
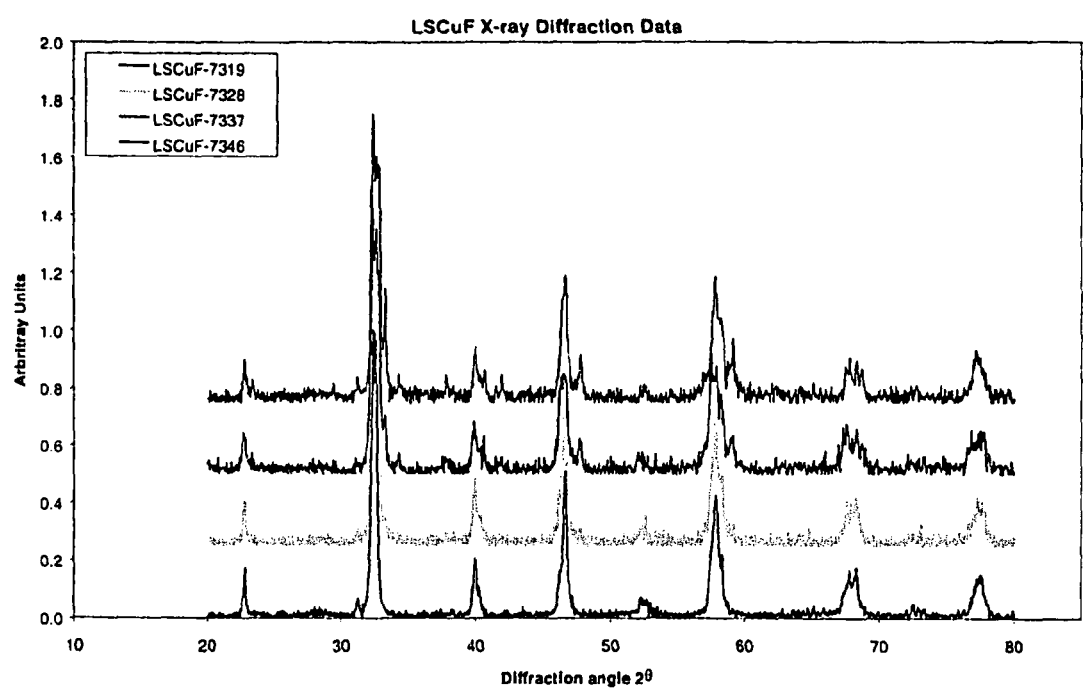
FIG. 8 contains X-ray diffraction spectra for copper-substituted LSF, and shows the compositions to be consistent with a single crystallographic phase for each composition.

For use in the experiments reported herein, substituted lanthanum ferrite powders were prepared from mixed nitrate solutions by a glycine/nitrate combustion process using La, Sr, Cu, and Fe nitrate stock solutions mixed according to the desired final stoichiometry, and standardized using either gravimetric or complexiometric titration means. Glycine was added at half of the stoichiometric amount. The glycine-nitrate mixtures were then combusted and the ash was calcined, sieved and then further calcined at 1200° C. for 2 hours. After that, phase compositions were analyzed by a X-ray powder diffraction method. A single-phase cubic perovskite structure similar to un-substituted lanthanum strontium ferrite was confirmed for all powders prepared, as is shown in FIG. 8.

Next, the powders were attrition milled to reduce the average particle size to less than 0.5 μm. The attrition milling procedure included powder milling with media for 5 minutes at 550 rpm, sampling and checking the particle size. If the average particle size was larger than desired, the powder was attrition milled until the desired particle size was reached. After that, the powder was removed from the mill, dried, and passed through a 325 mesh screen. Electrode inks were prepared by mixing the powder with a commercial binder in a three-roll mill. Electrode inks were used to construct test cells as discussed in greater detail below.

Multiple test compositions were prepared having various levels of A-site and/or B-site substitution. For example, a base lanthanum ferrite composition consisting of 20% strontium substitution for lanthanum was designated LSF-20. In other samples, iron in the ferrite was partially substituted by copper up to 40 atom percent. For example, the designation LSCuF-8219 indicates that 20 percent of the lanthanum has been replaced by strontium and 10 percent of the iron has been replaced by copper. This composition can alternatively be identified by the formula $La_{0.8}Sr_{0.2}Cu_{0.1}Fe_{0.9}O_3$. Another sample, identified by the formula $La_{0.8}Sr_{0.2}Cu_{0.2}Fe_{0.8}O_3$, is denoted as LSCuF-8228. Similar nomenclature is used for the other compositions featuring substitution at the A-site and at the B-site.

Cathodes were prepared from the sample powders by preparing a porous electrode ink as described above. The ink was produced by combining 50% oxide powder and 50% binder by weight, which was then mixed using an Exakt 11671 three-roll mill. The inks were screen-printed onto cubic zirconia electrolytes and sintered to provide porous electrodes having a thickness of about 10 microns. Sintering was achieved at a temperature of 950° C., which makes the material compatible with other SOFC stack fabrication processes. Some of the electrochemical cells were prepared using a ceria-20 percent samaria buffer layer between the cathode layer and the electrolyte layer to lower interactions between the zirconia electrolyte and electrode compositions.

Figure 4:
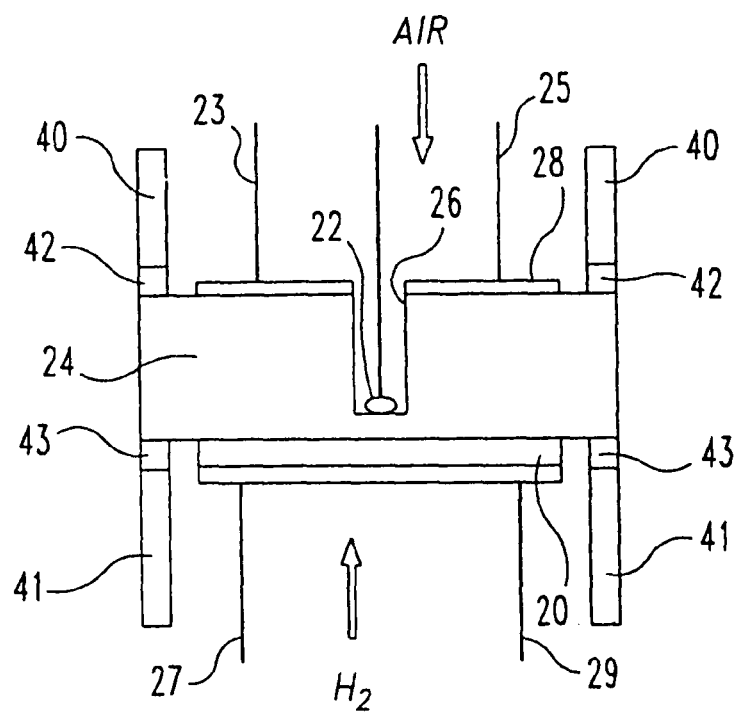
FIG. 4 depicts a side sectional view of the configuration of a three-electrode cell as described in the Examples for use in cathode polarization studies.

Samples were tested using a three-electrode cell configuration with a Lugin-Haber type reference electrode. The electrodes were tested using DC current interrupt methods to compare relative electrolytic activity. In the three-electrode configuration, as depicted in FIG. 4, the potential is measured between the anode 20 and a non-polarizable reference electrode 22, to determine the specific cathode polarization loss, i.e., cathode overpotential, by DC current interrupt spectroscopy. The three-electrode cells were based on a dense 4 mm-thick 8 mole % $Y_2O_3$-stabilized $ZrO_2$ (DKKK 8YSZ) cylindrical pellet 24 that was uniaxially pressed at 34 MPa followed by cold isostatic pressing at 413 MPa and sintering at 1400° C. in air. Each pellet was 12.5 mm in diameter and had a 1 mm diameter bore 26 in the center on one side. The reference electrode was a 0.75 mm silver bead coated with a small amount of silver paint on the end of a 0.5 mm platinum wire. The counter electrode was screen-printed platinum paint with a platinum screen contact. The working electrode was prepared by screen printing on the appropriate thickness of LSCuF ink, as described herein, and sintered to various temperatures. Contact to the LSCuF was through a platinum screen.

Each cell was mounted between two vertical alumina tubes 40, 41 and isolated from the environment by sealing with gold rings 42, 43. The cell apparatus also included an electric furnace and a potentiostat. After the device was heated to 850-900° C. in air, hydrogen was introduced into the anode compartment to reduce the anode. The opposite side of the cell was supplied with air. The proximity (typically around 10 mV) of the electrode potential at zero current, i.e., open-circuit potential, to the thermodynamic potential expected under the experimental conditions was treated as an indication of good sealing in the set-up.

Experiments were performed at atmospheric pressure in the temperature range 600-800° C. or 650-850° C. The temperature was monitored by two thermocouples placed at the opposite sides of the YSZ disc. A mixture of hydrogen and nitrogen or methane and nitrogen saturated with water at room temperature ($pH_2O$ of about 3 kPa) prior to the reactor inlet was used as a fuel gas. The gas flow was measured with mass flow controllers. The flow rate was varied from 20 to 200 $cm^3$/min.

Cyclic voltamograms were taken at 10 mV/sec scan rate on a Solatron SI 1287 potentiostat/galvanostat. The data were recorded with and without the use of current interrupt. A 40 msec time delay was used for the current interrupt potential determination.

For other experimental procedures involving conductivity measurements, powders were pressed into rectangular bars 2.5 cm in length and 1.0 cm wide by uniaxial pressing at 34 MPa, followed by cold isostatic pressing at 413 MPa and then sintered in air under empirically determined conditions to obtain samples having densities of greater than 95%. After sintering, the density was assessed using the Archimedes method in ethanol. Phase development was determined by x-ray diffraction (XRD) analysis using Cu Kα radiation (XRG 3100, Phillips Electronic Instrument, Mahwah, N.J.). After sintering the samples were ground and sieved using a 45 mm sieve. The spectra obtained were compared to known spectra of similar perovskite compounds to determine phase concentration after background removal using Jade+ v2.1 software (Materials Data Inc., Livermore, Calif.). To determine both open and closed porosity, the theoretical densities were calculated using the lattice parameters obtained from the diffraction analysis and compared to the densities measured by the Archimedes method.

Conductivity specimens were wrapped with four platinum wires (referred to herein as "Pt wires"), which were held in place by small notches cut on the sample surfaces. Electrical conductivity was measured in air using a four point DC conductivity method on the rectangular bars described above. The temperature ranged from approximately 400° C. to 900° C. and was ramped at approximately two degrees per minute.

Example Two

Figure 9:
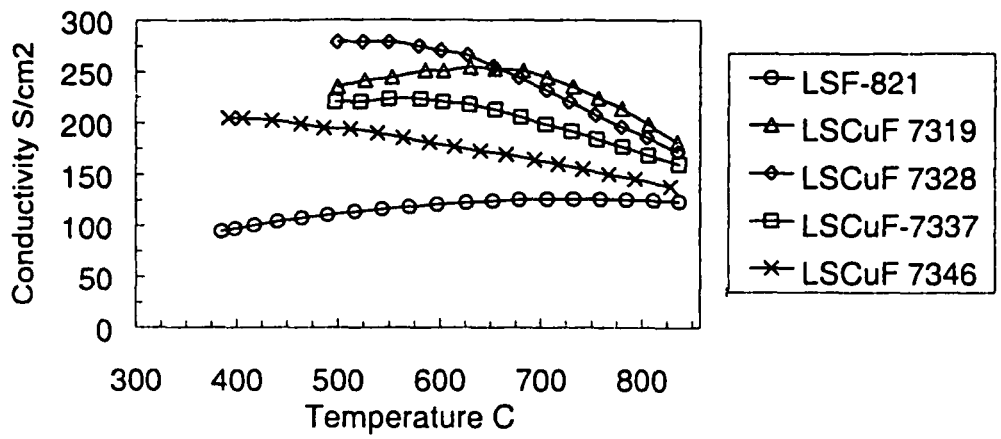
FIG. 9 is a plot of the electronic conductivity of LSF with varying levels of copper substitution for iron as a function of temperature, showing that copper doping enhances the electronic conductivity of lanthanum strontium ferrite.

Properties of Lanthanum Strontium Ferrites with and without Copper Modification Electrical Characteristics The electrical conductivity, σ, of LSCuFe samples and an LSF sample was determined as a function of the temperature and amount of copper substitution, shown in FIG. 9. These results demonstrate that copper substitution for iron increases the conductivity over a wide temperature range.

These tests showed that the copper-substituted ferrite material has a significantly lower area specific resistance at all temperatures than unsubstituted ferrite, establishing that its electrical properties are well suited for use as an air electrode in an SOFC system. Indeed, the performance of the copper-substituted material is better at each of these temperatures is better than the performance of the unsubstituted material at any of these temperatures.

Thermal and Chemical Expansion

Figure 10:
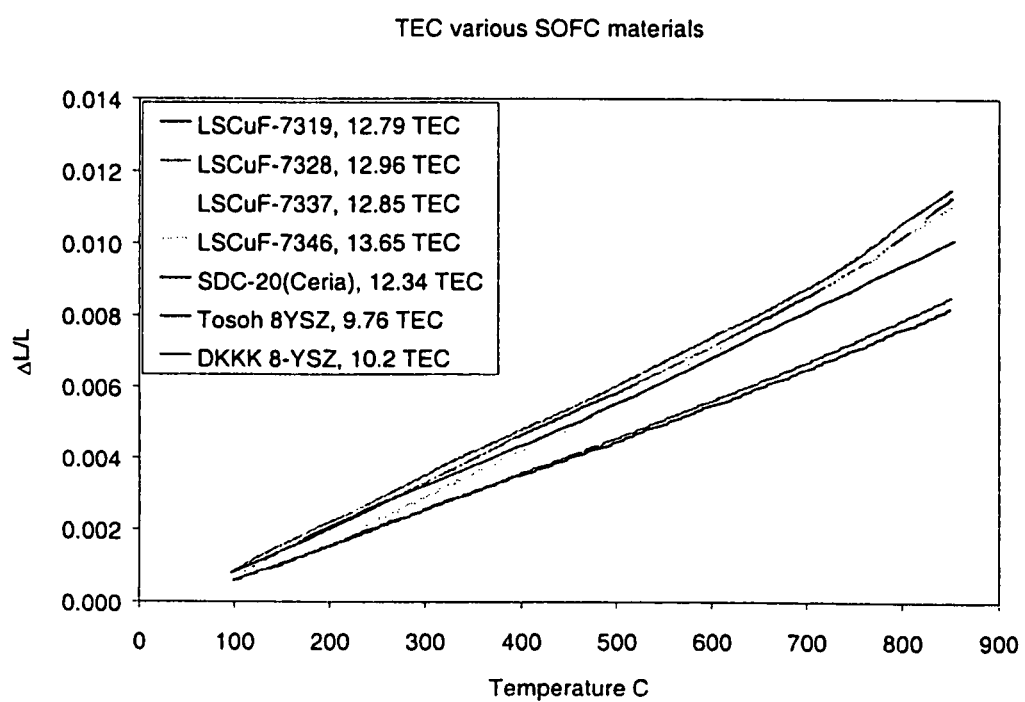
FIG. 10 is a plot of the expansion behavior of copper-substituted LSF versus temperature.

The thermal expansion behavior of $La_{0.7}Sr_{0.3}Cu_yFe_{1-y}O_3$ (y=0.1-0.4) sintered in air is shown in FIG. 10. For comparison, the thermal expansion of 8 mole % yttria-doped zirconia is plotted as well. The copper-substituted lanthanum strontium ferrites offer an acceptable thermal expansion match to YSZ with the LSCuF-7319 materials being the most favorable. The average thermal expansion coefficients (TEC) calculated in the temperature range 50-1000° C. were between 12 to 14 $(10^{-6})$ $K^{-1}$ for $L_{0.7}Sr_{0.3}Cu_yFe_{1-y}O_3$ (y=0.1-0.4). These data indicate that the TEC match between inventive materials and YSZ are acceptable for use of these materials as cathodes in SOFC systems.

Electrocatalytic Properties

Figure 6:
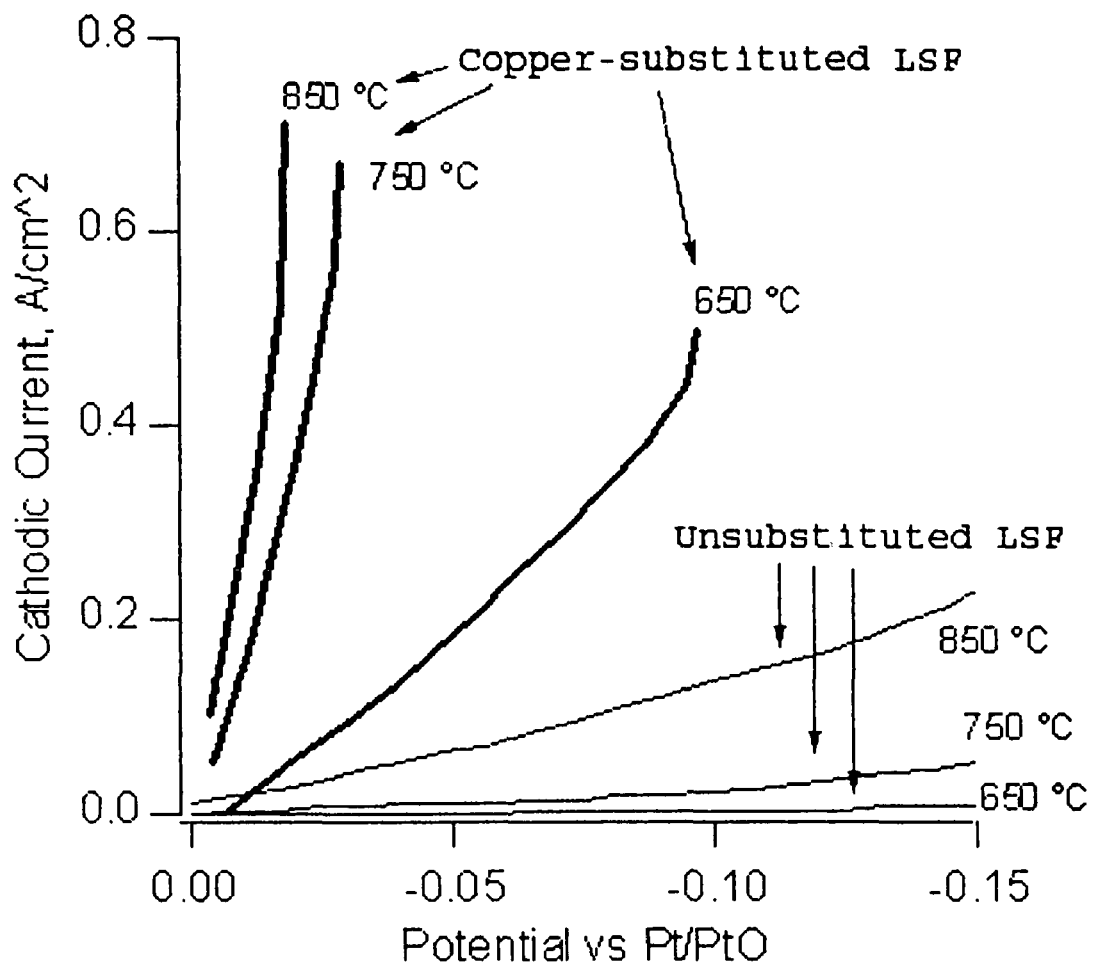
FIG. 6 is a plot showing current density versus polarization loss curves at three temperatures for the LSF-20 cathode and the LSCuF-8219 cathode, showing that copper substitution substantially lowers the resultant polarization loss.
Figure 11:
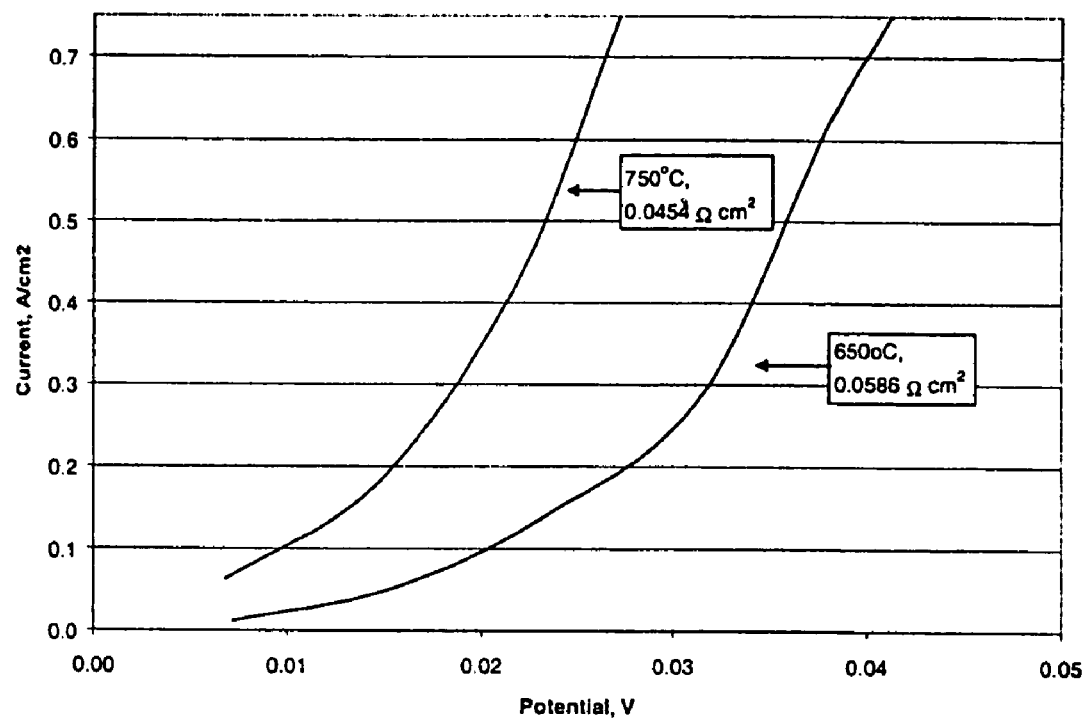
FIG. 11 is a plot of current density versus cathodic polarization loss for LSCuF-7328. Area specific resistances were less than 0.1 ohm-$cm^2$ at 650° C.

Typical electrode polarization results for a copper-substituted lanthanum ferrite cathode in air at 650, 750, and 850° C. are illustrated in FIG. 6. All current interrupt results given herein are corrected for the ohmic drop in the YSZ electrolyte pellet between the working electrode and the reference. As seen in FIG. 6, the polarization resistances of the $La_{0.8}Sr_{0.2}Cu_{0.1}Fe_{0.9}O_3$ (LSCuF-8219) cathode at 650, 750, and 850° C. are 0.25, 0.05 and 0.03 $\Omega cm^2$. Similar polarization resistance values were obtained on the copper-substituted lanthanum ferrite cathodes of the formula $La_{0.7}Sr_{0.3}Cu_{0.2}Fe_{0.8}O_3$ (LSCuF-7328) under the identical experimental conditions, as shown in FIG. 11. Such low polarization resistances attest to the high electrocatalytic activity of these cathodes for the reduction of oxygen, a necessary step in the operation of solid oxide fuel cells and oxygen separation devices.

FIG. 6 compares the polarization loss to current for a SOFC having a copper-substituted ferrite cathode and an unsubstituted cathode at these temperatures. This information shows that when polarization loss attributed to the cathode is measured at three different temperatures, the copper-substituted cathode features an ability to maintain a much higher current at all three temperatures than is maintained at any of the three temperatures by the unsubstituted LSF cathodes. These results show that the overpotential of a copper-substituted electrode does not strongly depend on temperature. No mass transfer region is observed and the current rapidly increased beyond the 1.5 amp supply limit of the electrochemical instrumentation used for this work. Due to instrument limitations, the peak performance of the copper-substituted cathode materials exhibit a greatly enhanced oxygen reduction catalytic activity with relatively little variance observed at varying temperatures.

Figure 5:
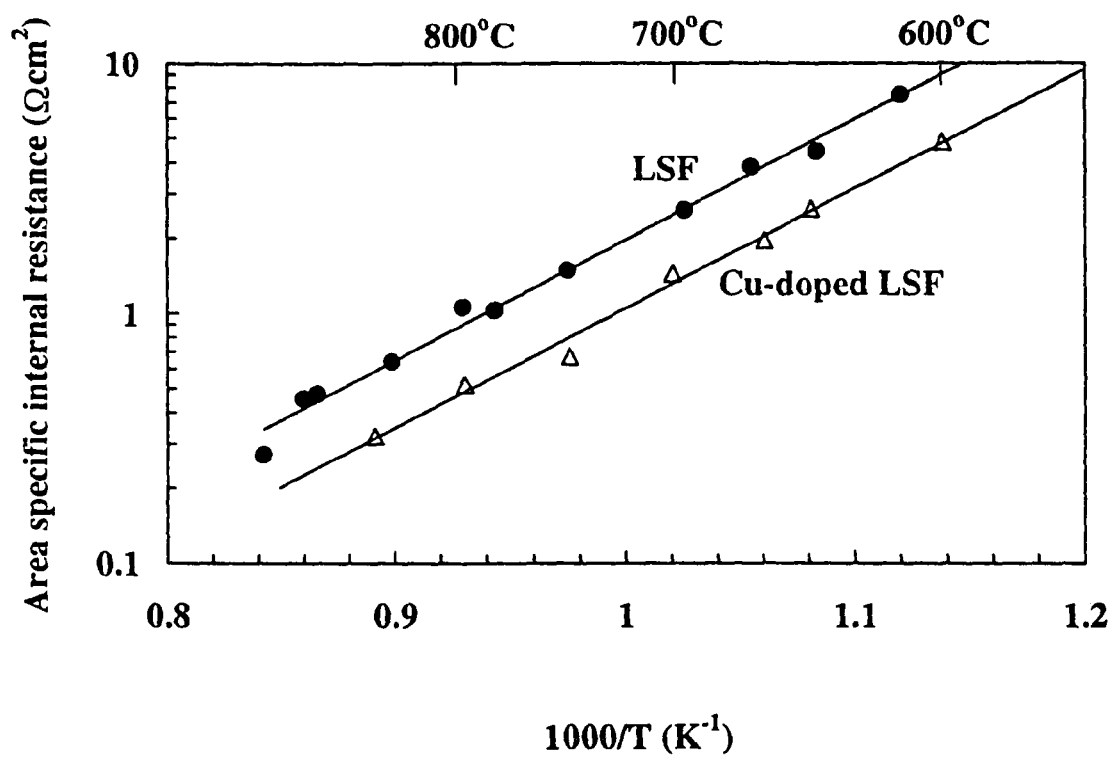
FIG. 5 is an Arrhenius plot for the area specific polarization resistance versus reciprocal temperature for copper-substituted lanthanum strontium ferrite and unsubstituted lanthanum strontium ferrite cathodes in air, showing that copper substitution significantly lowers the polarization loss associated with the cathode.

Temperature effect on the area specific polarization resistance of an SOFC constructed using a 150 micron-thick zirconia electrolyte, a nickel-zirconia cermet anode, and a copper-substituted $La_{0.8}Sr_{0.2}Cu_{0.2}Fe_{0.8}O_3$ cathode at a cell potential of 0.7 volts is summarized in an Arrhenius type plot in FIG. 5. In FIG. 5, the anode was exposed to a mixture of hydrogen/water in a 97% to 3% ratio, while the cathode was exposed to flowing air. Decreasing temperature from 800 to 600° C. results in concomitant increasing the $R_p$ from ~0.8 $\Omega cm^2$ to 8 $\Omega cm^2$. Such a value of the overall cell resistance for an electrolyte-supported cell is acceptable for use in a variety of electrochemical devices. It is important that no degradation in copper-substituted $La_{0.8}Sr_{0.2}Cu_yFe_{1-y}O_3$ (y=10-20 at. %) cathode performance with time (over 200 hours tested) was observed.

Example Three

Figure 7:
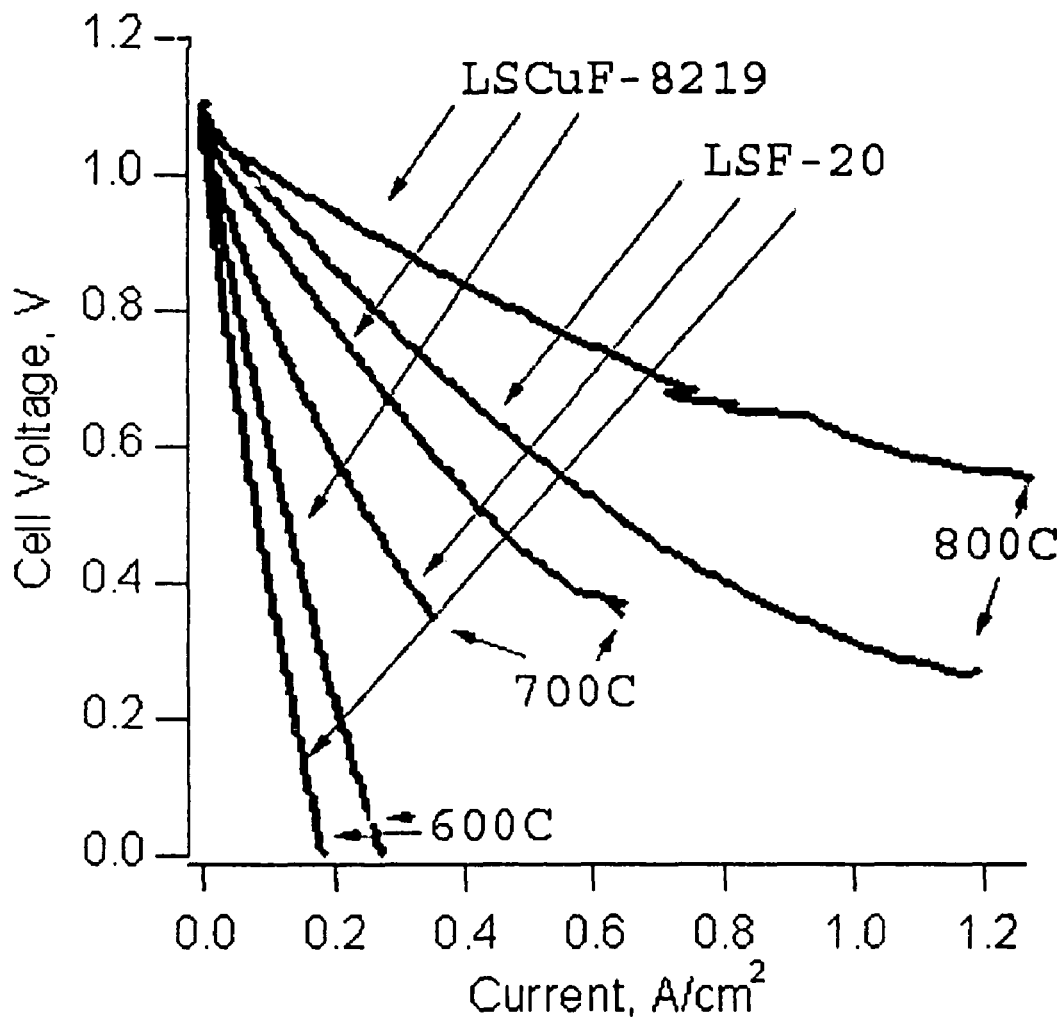
FIG. 7 is a plot showing the variation of the SOFC cell voltage for 150 μm electrolyte-supported cells with yttria-stabilized zirconia electrolyte, nickel-zirconia cermet anodes and either LSCuF-8219 or LSF cathodes as a function of the current density. T=600, 700 or 800° C. Fuel is $H_2/H_2O=97/3$, and oxidant is air. Copper substitution is shown to result in improved fuel cell performance.

Performances of Solid Oxide Fuel Cells with Copper-Substituted Lanthanum Strontium Ferrite Cathodes FIG. 7 presents performances of 160 μm-thick electrolyte-supported cells with a nickel-zirconia anode and either copper-substituted $La_{0.8}Sr_{0.2}Cu_{0.1}Fe_{0.9}O_3$ or standard $La_{0.8}Sr_{0.2}FeO_3$ cathodes at 600, 700 and 800° C. It is seen that at 0.7 Volt the cell with the $La_{0.8}Sr_{0.2}Cu_{0.1}Fe_{0.9}O_3$ cathode yields a current density of 0.75 A/cm² at 800° C. All other factors being equal, the cell with the $La_{0.8}Sr_{0.2}FeO_3$ cathode yields a current density of 0.4 A/cm². Thus, the current voltage curves are substantially enhanced compared to the conventional LSF cathode material. Cells using the new materials show approximately 2-3 times the power density compared to cells using LSF cathodes. No degradation in performance of cells with copper-substituted $La_{0.8}Sr_{0.2}FeO_3$ (y=10-20 at. %) cathodes was traced over the maximum tested time of 200 hours.

Example Four

Prophetic Example

Properties of A-Site and B-Site Substituted Lanthanum Ferrites Having Mixed Transition Metals Substituted at the B-Site Alternative cathode material compositions are made as described herein by modification of $La_{0.8}Sr_{0.2}FeO_3$ with a mixture comprising a combination of copper and one or more transition metals, including Ni, Co, and Cr to produce a mixed transition metal-substituted lanthanum strontium ferrite. Substituted lanthanum strontium ferrite powders having B-site substitution by 20 at % copper and 20 at % nickel, chromium, manganese, aluminum or cobalt, were prepared by glycine/nitrate combustion methods as described above. After calcination at 1200° C. for 2 h, powders were attrition milled to reduce the average particle size to less than 0.5 μm, and electrode inks were prepared by mixing the powder with a commercial binder in a 3-roll mill as described above. As determined by X-ray powder diffraction, all metal-modified $La_{0.8}Sr_{0.2}Cu_{0.2}Fe_{0.8}O_3$ (with metal added at 20 at. % and where the metal is Ni, Cr and Co, respectively) showed a single-phase cubic perovskite structure. In one example, the mixture includes at least about 5 mole % copper and up to 95 mole % of one or more other transition metals.

While the invention has been illustrated and described in detail in the drawings and foregoing description, the same is to be considered as illustrative and not restrictive in character, it being understood that only selected embodiments have been shown and described and that all changes, equivalents, and modifications that come within the spirit of the invention described herein or defined by the following claims are desired to be protected. Any experiments, experimental examples, or experimental results provided herein are intended to be illustrative of the present invention and should not be considered limiting or restrictive with regard to the invention scope. Further, any theory, mechanism of operation, or finding stated herein is meant to further enhance understanding of the present invention and is not intended to limit the present invention in any way to such theory, mechanism or finding. All publications, patents, and patent applications cited in this specification are herein incorporated by reference as if each individual publication, patent, or patent application were specifically and individually indicated to be incorporated by reference and set forth in its entirety herein.

What is claimed is:

1. A solid oxide fuel cell for electrochemically reacting a fuel gas with an oxidant gas to produce a DC output voltage, said solid oxide fuel cell comprising:
a layer of ceramic ion conducting electrolyte defining first and second opposing surfaces; a conductive anode layer positioned at the first surface of said electrolyte layer; and a conductive cathode layer positioned at the second surface of said electrolyte layer; wherein said electrolyte layer is disposed between said anode layer and said cathode layer;
wherein said conductive cathode layer consists essentially of a copper-substituted ferrite perovskite material and the copper-substituted ferrite perovskite material is in contact with said electrolyte layer;
wherein said solid oxide fuel cell is operable at temperatures less than about 750° C.

2. The fuel cell in accordance with claim 1 wherein the perovskite material includes B-site atoms and copper is present in the perovskite material in an amount of at least 2 atomic percent, based on total amount of B-site atoms present in the perovskite material.

3. The fuel cell in accordance with claim 1 wherein the perovskite material includes B-site atoms and said copper is present in the copper-substituted ferrite material in an amount of at least about 5 atomic percent, based on total amount of B-site atoms present in the copper-substituted ferrite material.

4. The fuel cell in accordance with claim 1 wherein the material is a copper-substituted lanthanum ferrite perovskite material.

5. The fuel cell in accordance with claim 4 wherein the material includes an A-site dopant selected from the group consisting of Mg, Ca, Sr, Ba, Pr, Nd, Sm and combinations thereof.

6. The fuel cell in accordance with claim 5 wherein the A-site dopant is Mg.

7. The fuel cell in accordance with claim 5 wherein the A-site dopant is Ca.

8. The fuel cell in accordance with claim 5 wherein the A-site dopant is Ba.

9. The fuel cell in accordance with claim 5 wherein the A-site dopant is Pr.

10. The fuel cell in accordance with claim 5 wherein the A-site dopant is Nd.

11. The fuel cell in accordance with claim 5 wherein the A-site dopant is Sm.

12. The fuel cell in accordance with claim 5 wherein the A-site dopant is strontium.

13. The fuel cell in accordance with claim 5 wherein the A-site dopant is present in the copper-substituted lanthanum ferrite material in an amount of from about 5 atomic percent to about 80 atomic percent, based on total amount of A-site atoms present in the copper-substituted lanthanum ferrite material, and copper is present in the copper-substituted lanthanum ferrite material in an amount of from about 5 atomic percent to about 60 atomic percent, based on total amount of B-site atoms present in the copper-substituted lanthanum ferrite material.

14. The fuel cell in accordance with claim 5 wherein the copper-substituted lanthanum ferrite material further comprises at least one B-site dopant selected from the group consisting of nickel, cobalt, manganese, aluminum and chromium.

15. The fuel cell in accordance with claim 14 wherein the B-site dopant is nickel.

16. The fuel cell in accordance with claim 14 wherein the B-site dopant is cobalt.

17. The fuel cell in accordance with claim 14 wherein the B-site dopant is manganese.

18. The fuel cell in accordance with claim 14 wherein the B-site dopant is aluminum.

19. The fuel cell in accordance with claim 14 wherein the B-site dopant is chromium.

20. The fuel cell in accordance with claim 1 wherein the copper-substituted ferrite cathode exhibits a polarization resistance of from about 0.03 to about 0.50 $\Omega cm^2$ at 650° C. in air.

21. The fuel cell in accordance with claim 1 wherein the copper-substituted ferrite cathode exhibits a polarization resistance of about 0.06 $\Omega cm^2$ at 650° C. in air.

22. The fuel cell in accordance with claim 1 wherein the copper-substituted ferrite material comprises a layer having a thickness of from about 1 to about 50 microns.

23. The fuel cell in accordance with claim 1 wherein the copper-substituted ferrite material comprises a layer having a thickness of from about 1 to about 30 microns.

24. The fuel cell in accordance with claim 1 wherein the copper-substituted ferrite material comprises essentially the entire cathode layer.

25. The fuel cell in accordance with claim 1 wherein the copper-substituted ferrite material comprises at least about 25% of said cathode layer.

26. The fuel cell in accordance with claim 1 wherein said cathode layer comprises a substantially homogenous mixture of a copper-substituted ferrite material and a finely-divided form of a second material.

27. The fuel cell in accordance with claim 1 wherein said cathode layer consists essentially of a perovskite composition having the formula:

$$La_{1-x-x'}Sr_xA'_{x'}Cu_yB'_{y'}Fe_{1-y-y'}O_3$$

wherein x is from about 0.05 to about 0.6; y is from about 0.05 to about 0.5; x' is from 0 to about 0.5; and y' is from 0 to about 0.4.

28. The fuel cell in accordance with claim 1, further comprising at least one metallic interconnect.

29. The fuel cell in accordance with claim 1 wherein the copper-substituted lanthanum ferrite material further comprises at least one B-site dopant selected from the group consisting of nickel, cobalt, manganese, aluminum and chromium.

30. The fuel cell in accordance with claim 29 wherein the B-site dopant is manganese.

31. The fuel cell in accordance with claim 1 wherein the electrolyte layer comprises a yttria-stabilized zirconium oxide.

32. A solid oxide fuel cell assembly for electrochemically reacting a fuel gas with a flowing oxidant gas to produce a DC output voltage, said assembly comprising a plurality of integral fuel cell units, each unit comprising a layer of ceramic ion conducting electrolyte disposed between a conductive anode layer and a conductive cathode layer, and further comprising a metallic interconnect between the anode layer of a first fuel cell unit and the cathode layer of an adjacent second fuel cell unit; wherein the cathode layer of at least one of said fuel cells consists essentially of a copper-substituted ferrite perovskite composition and the copper-substituted ferrite perovskite composition is in contact with said electrolyte layer; wherein said solid oxide fuel cell is operable at temperatures less than about 750° C.

33. The fuel cell assembly in accordance with claim 32 wherein the perovskite composition includes B-site atoms and copper is present in the composition in an amount of at least about 2 atomic percent, based on total amount of B-site atoms present in the material.

34. The fuel cell assembly in accordance with claim 32 wherein the perovskite composition includes B-site atoms and said copper is present in the copper-substituted ferrite composition in an amount of at least about 5 atomic percent, based on total amount of B-site atoms present in the copper-substituted ferrite composition.

35. The fuel cell assembly in accordance with claim 32 wherein the composition is a copper-substituted lanthanum ferrite perovskite composition.

36. The fuel cell assembly in accordance with claim 35 wherein the composition includes an A-site dopant selected from the group consisting of Mg, Ca, Sr, Ba, Pr, Nd, Sm and combinations thereof.

37. The fuel cell assembly in accordance with claim 36 wherein the A-site dopant is strontium.

38. The fuel cell assembly in accordance with claim 36 wherein the A-site dopant is present in the copper-substituted lanthanum ferrite composition in an amount of from about 5 atomic percent to about 80 atomic percent, based on total amount of A-site atoms present in the copper-substituted lanthanum ferrite composition, and copper is present in the copper-substituted lanthanum ferrite composition in an amount of from about 5 atomic percent to about 60 atomic percent, based on total amount of B-site atoms present in the copper-substituted lanthanum ferrite composition.

39. The fuel cell assembly in accordance with claim 36 wherein the copper-substituted lanthanum ferrite composition further comprises at least one B-site dopant selected from the group consisting of nickel, cobalt, manganese, aluminum, and chromium.

40. The fuel cell assembly in accordance with claim 32 wherein the copper-substituted ferrite cathode exhibits a polarization resistance of from about 0.03 to about 0.50 $\Omega cm^2$ at 650° C. in air.

41. The fuel cell assembly in accordance with claim 32 wherein the copper-substituted ferrite cathode exhibits a polarization resistance of about 0.06 $\Omega cm^2$ at 650° C. in air.

42. The fuel cell assembly in accordance with claim 32 wherein the copper-substituted ferrite composition comprises a layer having a thickness of from about 1 to about 50 microns.

43. The fuel cell assembly in accordance with claim 32 wherein the copper-substituted ferrite composition comprises a layer having a thickness of from about 1 to about 30 microns.

44. The fuel cell assembly in accordance with claim 32 wherein the copper-substituted ferrite composition comprises essentially the entire cathode layer.

45. The fuel cell assembly in accordance with claim 32 wherein the copper-substituted ferrite composition comprises at least about 25% of said cathode layer.

46. The fuel cell assembly in accordance with claim 32 wherein said cathode layer comprises a substantially homogenous mixture of a copper-substituted ferrite composition and a finely-divided form of a second material.

47. The fuel cell assembly in accordance with claim 32 wherein said cathode layer consists essentially of a perovskite composition having the formula:

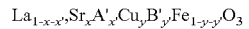

$$La_{1-x-x'}Sr_xA'_{x'}Cu_yB'_{y'}Fe_{1-y-y'}O_3$$

wherein x is from about 0.05 to about 0.6; y is from about 0.05 to about 0.5; x' is from 0 to about 0.5; and y' is from 0 to about 0.4.

48. The fuel cell assembly in accordance with claim 32, further comprising:
a system for passing a gaseous fuel in contact with said anode layers and passing an oxidizing gas in contact with said cathode layers.

49. The fuel cell in accordance with claim 32 wherein the copper-substituted lanthanum ferrite material further comprises at least one B-site dopant selected from the group consisting of nickel, cobalt, manganese, aluminum and chromium.

50. The solid oxide fuel cell assembly in accordance with claim 32 wherein the electrolyte layer comprises a yttria-stabilized zirconium oxide.

51. A solid oxide fuel cell for electrochemically reacting a fuel gas with an oxidant gas to produce a DC output voltage, said solid oxide fuel cell comprising:
a layer of ceramic ion conducting electrolyte defining first and second opposing surfaces;
a conductive anode layer positioned at the first surface of said electrolyte layer; and
a conductive cathode layer positioned at the second surface of said electrolyte layer;
wherein said electrolyte layer is disposed between said anode layer and said cathode layer; and wherein said conductive cathode layer consists essentially of a copper-substituted lanthanum ferrite perovskite material that includes at least one B-site dopant selected from the group consisting of nickel, cobalt, manganese, aluminum and chromium;
wherein said solid oxide fuel cell is operable at temperatures less than about 750° C.

52. The fuel cell in accordance with claim 51 wherein copper is present in the perovskite material in an amount of at least 2 atomic percent, based on total amount of B-site atoms present in the perovskite material.

53. The fuel cell in accordance with claim 51 wherein said copper is present in the copper-substituted ferrite material in an amount of at least about 5 atomic percent, based on total amount of B-site atoms present in the copper-substituted ferrite material.

54. The fuel cell in accordance with claim 51 wherein the perovskite material includes an A-site dopant selected from the group consisting of Mg, Ca, Sr, Ba, Pr, Nd, Sm and combinations thereof.

55. The fuel cell in accordance with claim 54 wherein the A-site dopant is strontium.

56. The fuel cell in accordance with claim 51 wherein the copper-substituted ferrite cathode exhibits a polarization resistance of from about 0.03 to about 0.50 $\Omega cm^2$ at 650° C. in air.

57. The fuel cell in accordance with claim 51 wherein the copper-substituted ferrite material comprises a layer having a thickness of from about 1 to about 50 microns.

58. The fuel cell in accordance with claim 51 wherein the copper-substituted ferrite material comprises a layer having a thickness of from about 1 to about 30 microns.

59. The fuel cell in accordance with claim 51 wherein the copper-substituted ferrite material comprises essentially the entire cathode layer.

60. The fuel cell in accordance with claim 51 wherein the copper-substituted ferrite material comprises at least about 25% of said cathode layer.

61. The fuel cell in accordance with claim 51 wherein said cathode layer comprises a substantially homogenous mixture of a copper-substituted ferrite material and a finely-divided form of a second material.

62. The fuel cell in accordance with claim 51 wherein said cathode layer comprises a perovskite composition having the formula:

$$La_{1-x-x'}Sr_xA'_{x'}Cu_yB'_{y'}Fe_{1-y-y'}O_3$$

wherein x is from about 0.05 to about 0.6; y is from about 0.05 to about 0.5; x' is from 0 to about 0.5; and y' is from 0 to about 0.4.

63. A solid oxide fuel cell assembly for electrochemically reacting a fuel gas with a flowing oxidant gas to produce a DC output voltage, said assembly comprising a plurality of integral fuel cell units, each unit comprising a layer of ceramic ion conducting electrolyte disposed between a conductive anode layer and a conductive cathode layer;
wherein the cathode layer of at least one of said fuel cells consists essentially of a copper-substituted ferrite perovskite material that includes at least one B-site dopant selected from the group consisting of nickel, cobalt, manganese, aluminum and chromium;
wherein said solid oxide fuel cell is operable at temperatures less than about 750° C.

64. The fuel cell in accordance with claim 51 wherein the electrolyte layer comprises a yttria-stabilized zirconium oxide.

* * * * *